United States Patent [19]

Puskar

[11] Patent Number: 4,729,589
[45] Date of Patent: Mar. 8, 1988

[54] DEVICE FOR INSERTING FILLING INTO A TACO SHELL

[76] Inventor: Samuel Puskar, 3353 Ivanhoe Rd., Sharpsville, Pa. 16150

[21] Appl. No.: 913,004

[22] Filed: Sep. 29, 1986

[51] Int. Cl.⁴ .............................................. A47J 43/28
[52] U.S. Cl. ................................... 294/26.5; 30/128; 294/7; 294/50; 425/286
[58] Field of Search .................. 294/1.1, 7, 32, 50, 294/50.5, 26.5, 55; D7/99, 100, 102, 106, 142; 30/128-130; 425/276, 278, 279, 281, 286

[56] References Cited

U.S. PATENT DOCUMENTS

| | | |
|---|---|---|
| 129,921 | 7/1872 | Bleakley ........................... 30/128 X |
| D. 255,971 | 7/1980 | Kelly ..................................... D7/102 |
| 510,286 | 12/1893 | Osterman .............................. 30/128 |
| 1,135,906 | 4/1915 | Ludwig ............................ 294/50 X |
| 1,352,755 | 9/1920 | Levy ..................................... 425/286 |
| 1,529,782 | 3/1925 | Gerstein .............................. 425/286 |
| 1,688,595 | 10/1928 | Parr ...................................... 425/281 |
| 1,798,490 | 3/1931 | Parr ...................................... 425/279 |
| 2,154,806 | 4/1939 | Clave et al. ......................... 425/286 |
| 2,178,648 | 11/1939 | Rothenbush ........................ 425/278 |
| 2,460,887 | 2/1949 | Kriz ................................... D7/102 X |
| 2,784,682 | 3/1957 | Clevenger ......................... D7/99 X |
| 2,794,335 | 6/1957 | Weems ................................... 30/128 |
| 2,974,615 | 3/1961 | Richardson ..................... 425/286 X |
| 3,358,619 | 12/1967 | Pareira ................................. 425/276 |
| 4,569,130 | 2/1986 | Koller et al. ........................ 294/7 X |

FOREIGN PATENT DOCUMENTS

| | | | |
|---|---|---|---|
| 484482 | 8/1928 | Fed. Rep. of Germany ........ 294/50 |
| 312576 | 1/1956 | Switzerland ............................. 294/7 |

*Primary Examiner*—Johnny D. Cherry
*Attorney, Agent, or Firm*—Mason, Fenwick & Lawrence

[57] ABSTRACT

A device for inserting a filling into a taco shell includes a base portion, a top portion, and an ejector portion slidably mounted on the base portion. The base portion includes an elongated handle portion having a lengthwise axis and a scoop portion with the scoop portion being substantially triangular. The handle portion is joined to the scoop portion at the vertex of the scoop portion. The top portion is movable on the base portion between a filling position and an emptied position and comprises an elongated plunger portion and an ejector portion which is substantially arcuate with the plunger portion being joined to the ejector portion at the center point of the ejector portion.

3 Claims, 8 Drawing Figures

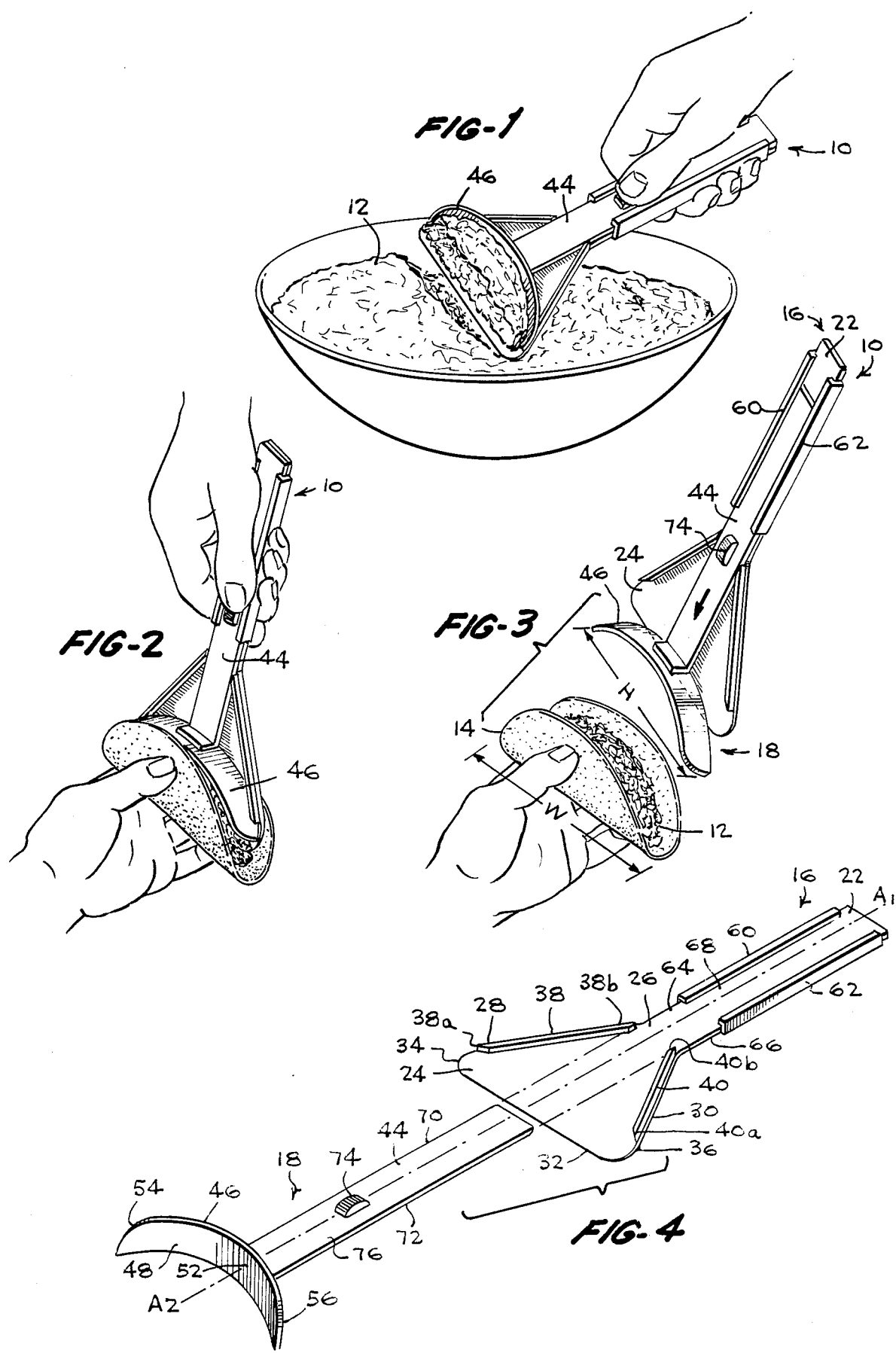

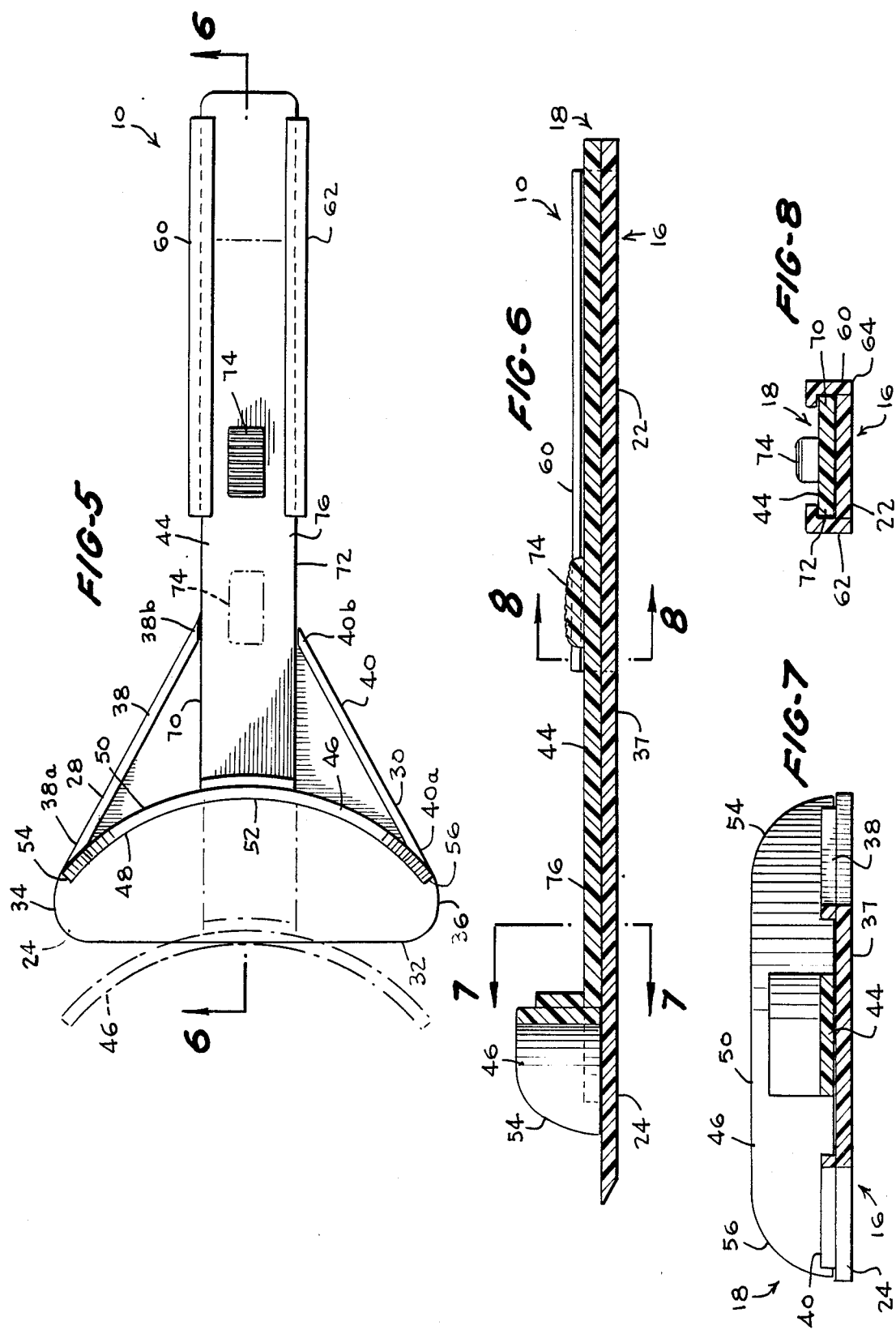

DEVICE FOR INSERTING FILLING INTO A TACO SHELL

BACKGROUND OF THE INVENTION

The present invention is directed to the field of serving food portions, and is more specifically directed to a device for inserting a filling into a taco shell or the like. Taco shells, as found in restaurants or as packaged for sales to consumers in food stores, have a substantially uniform shape and size. However, the shape, which in profile is substantially semi-circular, does not lend itself easily to filling with presently available devices. For example, a teaspoon, tablespoon, or large serving spoon can be used to deposit the filling in the taco shell, but this generally results in the entire portion of the filling being deposited in the center, and none in the sides. If a spoon is used, additional portions of filling can be inserted on either side, but because of the semi-circular shape, the filling will tend to fall out at the sides. Likewise, if the spoon is used to more evenly distribute the filling across the bottom of the taco shell, there will be too much filling at the sides, which will tend to fall out, and not enough filling at the center.

There are many specialized devices for serving specific kinds of food, but I have found that none of these are suitable for filling taco shells. For example, a number of different devices are known for serving a portion of food such as ice cream or hamburger meat. A common type of device for serving ice cream includes a scoop, a handle extending rearwardly from the scoop, and a plunger with an ejector bar mounted for reciprocating motion in the handle. The shape of the scoop is dependent upon the shape of the ice cream portion which is desired. Thus, the scoop is often triangular, to produce a portion which will fit into an ice cream cone or a tall ice cream dish. In such devices, the end of the scoop which is inserted into the ice cream forms the point of the triangle, to make introduction of the scoop into the hard ice cream easier. Such devices are characterized by U.S. Pat. Nos. 1,688,595 and 1,798,490 to Parr and 2,178,648 to Rothenbush. In other devices, the scoop is rectangular in shape, to form a rectangular brick for filling an ice cream sandwich. Such devices are characterized by U.S. Pat. Nos. 1,352,755 to Levy and 1,529,782 to Gerstein. Although all of these devices are excellent for their stated purpose, that is, serving portions of ice cream, the sizes and shapes of the various scoops prevent turning them to use in filling a taco shell.

Somewhat analogously, devices have been provided for slicing an opening in a sandwich bun and inserting into the opening the filling, for example a hamburger or a hot dog. Again, the shape of the scoop is dependent upon the shape of the sandwich bun, and the front is provided with a pointed blade for cutting the opening in the sandwich. Such a device is characterized by U.S. Pat. No. 2,784,682 to Clevenger. The size and shape of this type of device also renders it unsuitable for use in filling a taco shell.

In summary, no simple device exists which in shape and size is adapted to fill a taco shell with an amount of filling which corresponds to the shape of the taco shell. It is the solution of these problems to which the present invention is directed.

SUMMARY OF THE INVENTION

Therefore, it is the primary object of this invention to provide a device for inserting a filling into a taco shell wherein the device itself has a size and shape adapted to fit into a taco shell.

It is another object of this invention to provide a device for inserting an amount of filling into a taco shell wherein the filling corresponds to the shape of the taco shell.

It is still another object of this invention to provide a device for inserting filling into a taco shell which can be easily disassembled for cleaning.

The foregoing and other objects of the invention are achieved by provision of a device for inserting filling into a taco shell comprising a base portion and a top portion. The base portion comprises a scoop portion and a handle portion. The scoop portion is substantially triangular and has a vertex, two sides adjacent the vertex, and a base opposite the vertex. The handle portion is joined to the scoop portion at the vertex. The top portion is moveable on the base portion along the lengthwise axis of the base portion between a filling position and an emptied position and comprises an elongated plunger portion and an ejector portion. The ejector portion is substantially arcuate, the plunger portion being joined to the rearward surface of the ejector portion proximate the center point of the ejector portion. Means are provided for slidably mounting the top portion on the base portion. In one aspect of the invention, the mounting means comprises flanges extending from the sides of the handle portion for slidably engaging the sides of the plunger portion. In another aspect of the invention, the mounting means comprises a finger or pin projecting upwardly from the handle portion and an elongated aperture in the plunger portion for slidably engaging the finger or pin.

A better understanding of the disclosed embodiments of the invention will be achieved when the accompanying detailed description is considered in conjunction with the appended drawings, in which like reference numerals are used for the same parts as illustrated in the different figures.

BRIEF DESCRIPTION OF THE DRAWINGS

FIG. 1 is a perspective view illustrating usage of the preferred embodiment of the invention in its filling position in scooping filling for insertion into a taco shell;

FIG. 2 is a perspective view of the invention of FIG. 1 illustrating usage of the invention in inserting the filling into the taco shell;

FIG. 3 is a perspective view of the invention of FIG. 1 in its emptied position with the filling dispensed into the taco;

FIG. 4 is an exploded perspective view of the invention;

FIG. 5 is a top plan view of the invention;

FIG. 6 is a cross-sectional view of the invention taken along line 6—6 of FIG. 5;

FIG. 7 is a cross-sectional view of the invention taken along line 7—7 of FIG. 6; and FIG. 8 is a cross-sectional view of the invention taken along line 8—8 of FIG. 6.

DESCRIPTION OF THE PREFERRED EMBODIMENT

Referring now to FIGS. 1-8, there is illustrated a device 10 according to my invention for inserting a filling 12 into a taco shell 14. The device 10 comprises a base portion 16 and a top portion 18 movable on base portion 16 between a filling position, shown in FIGS. 1 and 2, and an emptied position, shown in FIG. 3.

Base portion 16 has a lengthwise axis A1 and comprises an elongated handle portion 22 and an adjacent scoop portion 24. Scoop portion 24 is substantially triangular and has a truncated vertex 26, two sides 28 and 30 adjacent vertex 26, and a base 32 opposite vertex 26. Preferably, the corners 34 and 36 where sides 28 and 30 adjoin base 32 are rounded, and base 32 is slightly shorter than the length L of taco shell 14. The bottom surface 37 of scoop portion 24 can be bevelled at base 32 to make it easier to insert scoop portion 24 into a bowl of the filling 12. Handle portion 22 is joined to scoop portion 24 at vertex 26.

Scoop portion 24 can also include shoulders 38 and 40 projecting upwardly from sides 28 and 30 from a point appproximately even with vertex 26 to a point rearward of base 32. Shoulders 38 and 40 preferably are tapered inwardly at both ends 38a and 38b and 40a and 40b for a purpose to be described hereinafter.

It should be understood that such directional terms as forward, forwardly, rearward, rearwardly, etc. are purely arbitrary, and that as used in this application, forward and forwardly refer to the direction of travel from vertex 26 towards base 32 of scoop portion 24 and that rearward and rearwardly and the like refer to the opposite direction.

Preferably, handle portion 22 and scoop portion 24 are formed from a unitary piece of material, although shoulders 38 and 40 can be formed separately. Also, scoop portion 24 must be formed of a material which is FDA approved for contact with food products. Among the suitable materials are acrylic plastic and stainless steel or other types of steel which are dishwasher safe.

Top portion 18 has a lengthwise axis A2 parallel to axis A1 and comprises an elongated plunger portion 44 and an ejector portion 46. Ejector portion 46 is substantially arcuate to conform to the semi-circular profile of taco shell 14 and has a concave forward surface 48, a convex rearward surface 50, a center point 52, and ends 54 and 56. The height H of ejector portion 46 is slightly less than the interior width W of taco shell 14 so that pusher portion 46 together with scoop portion 24 will fit inside taco shell 14. Preferably, ends 54 and 56 are rounded to accommodate the slightly rounded shape and reduced width W of taco shell 14 at its bottom.

Plunger portion 44 is joined to ejector portion 46 at center point 52 of rearward surface 50. Plunger portion 44 and ejector portion 46 can be formed from a unitary piece of material or from separate pieces of material, depending upon the material used. They should be formed from the same material as handle portion 22 and scoop portion 24.

Mounting means are provided for slidably mounting top portion 18 on base portion 16. As shown in FIGS. 1–8, the mounting means comprises flanges 60 and 62 extending respectively from sides 64 and 66 of handle portion 22 to form a keyway 68 for slidably engaging sides 70 and 72, respectively, of plunger portion 44. A thumb button 74 can be provided on the upper surface 76 of plunger portion 44 for the user to press against in moving top portion 18 between the filling and emptied positions. Alternate forms of mounting means (not shown) can also be used. For example, the mounting means can comprise a pin, finger, or rib projecting upwardly from handle portion 22 and a lengthwise aperture in plunger portion 44 for slidably engaging the pin, finger, or rib. Preferably, the pin, finger, or rib and the aperture would be configured so that ejector portion 18 can still be easily separated from base portion 16 for cleaning. Other equivalent structures undoubtedly will occur to those of skill in the art.

Although handle portion 22 and plunger portion 44 are shown in FIGS. 1–8 as being substantially planar, it is also possible to form plunger portion 44 with a round or oval cross-section and to form handle portion 22 as a tube with a lengthwise slot to accommodate thumb button 74.

A model built to test the operation of my device is similar to the embodiment of my invention shown in FIGS. 1–8. In this model, both base portion 16 and top portion 18 were constructed from acrylic plastic 0.3 centimeters thick. Handle portion 22 was substantially rectangular and 13.5 centimeters long by 2.4 centimeters wide. Scoop portion 24 was 8 centimeters from vertex 26 to base 32 and at its widest point just rearward of base 32 was 10 centimeters wide. Shoulders 38 and 40 extended upwardly 3 centimeters from the upper surface of scoop portion 24 and were set back from base 32 by 2 centimeters. Plunger portion 44 was substantially rectangular like handle portion 22 and made the same width, 2.4 centimeters, as handle portion 22, but was substantially longer than handle portion 22, about 17.5 centimeters. Ejector portion 46 was 2 centimeters high. An imaginary straight line drawn between ends 54 and 56 was 9.5 centimeters at forward surface 48, while an imaginary perpendicular drawn from that line to center point 52 was 2.6 centimeters at forward surface 48. It is noted that all measurements given with respect to this model are approximate.

In use, scoop portion 24 is inserted into a bowl of filling 12 with top portion 18 in its filling position (FIG. 1). In the filling position, forward ends 38a and 40a of shoulders 38 and 40, respectively, prevent rearward movement of ejector portion 46. The filling is formed in the desired shape by the curvature of ejector portion 46. Scoop portion 24 is then placed inside the taco shell 14 part way down (FIG. 2) and plunger portion 44 is moved forwardly by the action of the user's thumb on thumb button 74, causing ejector portion 46 to push filling 12 into the bottom of taco shell 14 (FIG. 3). Both rearward ends 38b and 40b of shoulders 38 and 40, respectively, and flanges 60 and 62 on handle portion 22 guide plunger portion 44 in a straight line as it moves forward. Preferably, device 10 is positioned in taco shell 14 so that most of ejector portion 46 can be extended beyond base 32, thereby depositing all of the filling 12 into taco shell 14. The device 10 is then in its emptied position. After use, plunger portion 44 can be slid forward out of keyway 68 so that base portion 16 and top portion 18 can be separated for washing.

Thus, it will be seen that all embodiments of the present invention provide a unique method of inserting filling into a taco shell or the like. While preferred embodiments of the invention have been disclosed, it should be understood that the spirit and scope of the invention are to be limited solely by the appended claims, since numerous modifications of the disclosed embodiments will undoubtedly occur to those of skill in the art.

I claim:

1. A device for inserting a filling into a taco shell, comprising:

a base portion having a lengthwise axis and comprising an elongated handle portion having a lengthwise axis and a scoop portion, said scoop portion being substantially triangular and having a truncated vertex, two sides adjacent said vertex, a base opposite said vertex, said handle portion being joined to said scoop portion at said vertex thereof and guide means mounted on said scoop portion on either side of said vertex for guiding said handle portion;

a top portion movable on said base portion along said lengthwise axis of said handle portion between a filling position and an emptied position and comprising an elongated plunger portion and an ejector portion, said ejector portion being substantially arcuate to conform to the profile of the taco shell and having a concave forward surface, a convex rearward surface, a center point, and two ends, said plunger portion being joined to said rearward surface of said ejector portion proximate said center point;

mounting means comprising keyway means mounted in said handle portion for slidably receiving the sides of said plunger portion for slidably mounting said top portion on said base portion for movement along said lengthwise axis and stop means mounted on said base portion for limiting rearward movement of said top portion; and wherein said stop means and said guide means are defined by shoulder means projecting upwardly from each of said two sides of said scoop portion with each of said shoulder means extending from a point proximate said vertex to a point rearward of said base.

2. A device for inserting a filling into a taco shell, comprising:

a base portion having a lengthwise axis and comprising an elongated handle portion having a lengthwise axis and a scoop portion, said scoop portion being substantially triangular and having a truncated vertex, two sides adjacent said vertex, and a base opposite said vertex, said handle portion being joined to said scoop portion at said vertex thereof and guide means mounted on said scoop portion on either side of said vertex for guiding said handle portion;

a top portion movable on said base portion along said lengthwise axis of said handle portion between a filling position and an emptied position and comprising an elongated plunger portion and an ejector portion, said ejector portion being substantially arcuate to conform to the profile of the taco shell and having a concave forward surface, a convex rearward surface, a center point, and two ends, said plunger portion being joined to said rearward surface of said ejector portion proximate said center point;

mounting means for slidably mounting said top portion on said base portion along said lengthwise axis; and stop means mounted on said base portion for limiting rearward motion of said top portion wherein said stop means and said guide means are defined by shoulder means projecting upwardly from each of said two sides of said scoop portion with each of said shoulder means extending from a point proximate said vertex to a point rearward of said base.

3. A device for inserting a filling into a taco shell, comprising:

a base portion having a lengthwise axis and comprising an elongated handle portion having a lengthwise axis and a scoop portion, said scoop portion being substantially triangular and having a truncated vertex, two sides adjacent said vertex, and a base opposite said vertex, said handle portion being joined to said scoop portion at said vertex thereof and guide means mounted on said scoop portion on either side of said vertex for guiding said handle portion;

a top portion movable on said base portion between a filling position and an emptied position and having a lengthwise axis parallel to said lengthwise axis of said base portion and comprising an elongated plunger portion and an ejector portion, said ejector portion being substantially arcuate to conform to the profile of the taco shell and having a concave forward surface, a convex rearward surface, a center point, and two ends, said plunger portion being joined to said said rearward surface of said ejector portion proximate said center point and wherein, the height of said ejector portion and said base portion together is slightly less than the interior width of the bottom of a taco shell and said base of said scoop portion is no longer than the length of a taco shell;

mounting means for slidably mounting said plunger portion on said handle portion along said lengthwise axis of said base portion;

stop means mounted on said scoop portion for limiting rearward motion of said ejector portion and wherein said stop means and said guide means are defined by shoulder means projecting upwardly from each of said two sides of said scoop portion and each of said shoulder means extends from a point proximate said vertex to a point rearward of said base.

* * * * *